United States Patent [19]

Takahashi et al.

[11] Patent Number: 5,238,760
[45] Date of Patent: Aug. 24, 1993

[54] MOLDED ARTICLE FOR NEGATIVE ELECTRODE, METHOD OF PRODUCING THE SAME AND LITHIUM SECONDARY BATTERY USING THE SAME

[75] Inventors: Yuzuru Takahashi; Jitsuo Oishi, both of Ibaraki, Japan

[73] Assignee: Mitsubishi Gas Chemical Company, Inc., Tokyo, Japan

[21] Appl. No.: 925,196

[22] Filed: Aug. 6, 1992

[30] Foreign Application Priority Data

Aug. 7, 1991 [JP] Japan ................................ 3-222207

[51] Int. Cl.$^5$ ............................................ H01M 10/40
[52] U.S. Cl. ................................... 429/194; 429/218; 264/29.1; 423/445
[58] Field of Search ..................... 429/194, 218, 209; 264/29.1; 252/502; 423/445, 447.7; 29/623.1

[56] References Cited

U.S. PATENT DOCUMENTS

| | | | |
|---|---|---|---|
| 4,702,977 | 10/1987 | Hiratsuka et al. | 429/218 X |
| 4,725,422 | 2/1988 | Miyabayashi et al. | 423/455 |
| 4,865,931 | 9/1989 | McCullough, Jr. et al. | 429/194 |
| 4,980,250 | 12/1990 | Takahashi et al. | 429/194 |

*Primary Examiner*—Anthony Skapars
*Attorney, Agent, or Firm*—Leydig, Voit & Mayer

[57] ABSTRACT

A mixture of carbon powder and a carbonaceous binder is molded and pyrolyzed in an atmosphere of nitrogen to form a carbon molded article for a negative electrode. The properties of the carbon molded article are: an interfacial distance (d002) within a range from 3.38 Å to 3.56 Å measured by X-ray diffraction; and a three-point strength of 100 kgf/cm$^2$ or greater at room temperature. A lithium secondary battery formed by using this carbon molded article as the negative electrode has a high energy density per unit volume and advantageous charge-discharge characteristics for higher loads.

25 Claims, No Drawings

MOLDED ARTICLE FOR NEGATIVE ELECTRODE, METHOD OF PRODUCING THE SAME AND LITHIUM SECONDARY BATTERY USING THE SAME

BACKGROUND OF THE INVENTION

1. Field of the Invention

The present invention relates to a molded article for a negative electrode, a method of producing the same and a lithium secondary battery using such a molded article. More particularly, the present invention relates to a molded article useful for the negative electrode of a lithium secondary battery, a method of producing the same, and the lithium secondary battery using such a molded article as the negative electrode. The molded article for a negative electrode of the present invention is very useful for the negative electrode of a lithium secondary battery because the molded article has a favorable mechanical strength, e.g., a three-point bending strength of 100 kgf/cm$^2$ or greater at room temperature, and sufficient energy density per unit volume to provide the lithium secondary battery with advantageous charge-discharge characteristics for higher loads.

2. Description of the Related Art

A lithium primary battery employing lithium metal as a negative electrode active substance has been widely used because it has advantages such as higher energy density, light weight, a compact size and long-term shelf life.

Though this lithium metal is effective when used as a negative electrode active substance in a lithium primary battery, if it is used as a negative electrode active substance in a lithium secondary battery, the use of lithium metal causes many problems which are not observed when it is used in a lithium primary battery. Because of such problems, it is not practical to use lithium metal as the negative electrode in a lithium secondary battery. More specifically, a lithium secondary battery having a lithium metal negative electrode has significant drawbacks such as short charge-discharge cycle life and low charge-discharge efficiency. These drawbacks result from deterioration of the negative electrode caused by an electrochemical reaction in which lithium metal is deposited in a dendritic form on the negative electrode during the processes of charge and discharge. A lithium secondary battery whose negative electrode is made of lithium metal inevitably experiences such deterioration of the negative electrode.

To solve the above problem which is the deterioration of the negative electrode when lithium metal is used in a secondary battery, many proposals have been made that negative electrodes be formed of carbon materials, such as pyrolysis residues of a conjugated polymer (Japanese Patent Application Laid-Open No. 58-093176), thermal decomposition products of polyarylacetylene (Japanese Patent Application Laid-Open No. 59-154763), pyrolysis residues of an organic compound (Japanese Patent Application Laid-Open Nos. 60-235372 and 62-090863), a carbon material having pseudo-graphite structure (Japanese Patent Application Laid-Open No. 62-122066) or a carbon molded article having a plane network six-membered ring structure (Japanese Patent Application Laid-Open No. 63-013282).

The lithium secondary batteries whose negative electrodes are formed of carbon materials utilize a reversible absorption-desorption reaction, i.e., an electrochemical reaction in which the carbon material absorbs lithium, i.e., a negative electrode active substance, during charge and releases the lithium into the electrolyte solution during discharge. Therefore, carbon particles forming the negative electrode, i.e., the carbon molded article (material), expand and shrink during charge and during discharge, i.e., while lithium is being absorbed and while it is being released, respectively.

Carbon materials, such as pyrolysis residues of polymers, used for the negative electrodes of lithium secondary batteries are generally in the form of powder. Therefore, to form negative electrodes of such carbon materials, the carbon materials must be molded in predetermined shapes by suitable methods such as pressure molding In general, a carbon material is homogeneously mixed with a polymer compound, e.g., polytetrafluoroethylene, polyethylene or polypropylene, as a binder, and then, the mixture is molded by pressure molding or roller molding. Another method in which a mixture of a solvent and a carbon material and a binder both dispersed in the solvent is applied to a current collector (an electrode member) is also known.

However, because the electrode (the positive and negative electrodes) formed by the above-described methods contains polymer compounds such as polytetrafluoroethylene or polypropylene added as a binder and, sometimes, a trace of the solvent, the electrodes have problems in that electric conductivity, which is supposed to be high due to the carbon materials, is reduced. More specifically, a battery having electrodes formed of a carbon material containing a polymer compound experiences increased overvoltage, which results in a reduced battery capacity and, in addition, heat generation. It has not been expected that a technique to solve these problems would be achieved.

As described above, in principle, a battery having electrodes formed as carbon molded articles containing a polymer compound, e.g, polytetrafluoroethylene and polypropylene, as a binder has significant problems in that overvoltage is increased so that the battery capacity is reduced and heat is generated When a carbon molded article containing such a polymer compound as a binder is employed as the negative electrode in a lithium secondary battery, carbon particles forming the carbon molded article (the negative electrode) experience cycles of expansion and shrinkage, respectively, caused during charge and discharge, i.e., during absorption and release of lithium. Because of stress fatigue caused by the repeated cycles of expansion and shrinkage, the binding capacity of the polymer compound added as a binder decreases with time and finally results in breakage of the carbon molded article. Detached carbon particles from this article enter into the electrolyte solution and, in the worst case, cause a short between the positive and negative electrodes. Thus, a carbon molded article for a negative electrode containing a polymer compound as a binder has a significant technical problem in that there is a potential danger of a short occurring between the electrodes.

The above problems connected with the use of a carbon molded article for a negative electrode must be solved in order that a lithium secondary battery having a negative electrode of a carbon molded article and advantageous charge-discharge characteristics for higher loads can be put into practical use.

SUMMARY OF THE INVENTION

Through a variety of basic experiments and investigations to solve the above-described problems of a carbon molded article for the negative electrode of a lithium secondary battery, the present inventors have found that a lithium secondary battery having a high energy density per unit volume, advantageous load characteristics, a high charge-discharge efficiency and advantageous stability in the charge-discharge cycle can be obtained by using carbon powder and a carbonaceous binder to form a carbon molded article for the negative electrode. After further study based on this finding, they have achieved the present invention. The present invention provides an article for a negative electrode which is formed by molding a mixture of carbon powder and a carbonaceous binder and pyrolyzing the molding in an inert gas atmosphere, such as an argon or nitrogen atmosphere so as to achieve an interfacial distance (d002) within a range from 3.38 Å to 3.56 Å and a three-point bending strength of at least 100 kgf/cm$^2$, and a method of producing such an article and a lithium battery employing the article as the negative electrode.

In this specification, the "interfacial distance (d002)" and "crystal size (L002)" mean the measurements obtained by using an X-ray diffraction method (described by S. Ohtani in "Carbon Fiber", Kindai-Henshusha, 1986, pages 733–742) which uses CuKα as the X-ray and high-purity silicon as the standard substance. "Specific surface area" means the measurements obtained by using a "flow type specific surface area autoanalyzer model FlowSorbII Type 2300" made by KABUSHIKI KAISHA SHIMADZU SEISAKUSHO according to BET-method utilizing nitrogen gas absorption. Further, "mean particle size" means the measurements obtained by using a "laser diffraction particle size analyzer model LA-500" made by KABUSHIKI KAISHA HORIBA SEISAKUSHO according to Fraunhofer diffraction and Mie scattering theory.

A carbon molded article for a negative electrode according to the present invention is produced by homogeneously mixing carbon powder and a carbonaceous binder by a known method, molding the mixture in, e.g., a metal mold, into a predetermined shape and predetermined dimensions, and heating to pyrolyze the mold at 800° to 1500° C. in an inert gas or a vacuum. In detail, the amount of the carbonaceous binder to be blended in is generally determined within a range from 8 to 25 parts by weight with respect to 100 parts by weight of the carbon powder, though the ratio thereof varies depending on the dimensions and use of the carbon molded article for a negative electrode to be produced. According to a normal method, the homogenized mixture of the carbon powder and the carbonaceous binder is pressure-molded in, for example, a metal mold, into a predetermined shape. Alternatively, the mixture is processed into a sheet having a thickness of 0.05 to 50 mm and the sheet is punched to obtain a carbon article of a predetermined shape. The thus obtained carbon molded article is pyrolyzed at 800° to 1500° C. in an inert gas, such as argon gas or nitrogen gas, or in a vacuum to produce a carbon molded article to be used as a negative electrode.

The thus obtained carbon molded article for a negative electrode has the required properties for a negative electrode of a lithium secondary battery. However, to provide high performance and quality that are reliable in actual use, the present invention imposes a quality standard which restricts the interfacial distance (d002). According to the present invention, the interfacial distances (d002) in the carbon molded articles for negative electrodes are controlled within a range from 3.38 Å to 3.56 Å measured by X-ray diffraction. This control on the range of the interfacial distance (d002) by using X-ray diffraction is determined based on production control precision and error in the production processes so as to provide high performance and quality that are reliable in actual use. If the interfacial distance (d002) of a carbon molded article for a negative electrode is greater than 3.56 Å, the charge-discharge efficiency will be reduced and the voltage may also be reduced. If the interfacial distance (d002) is less than 3.38 Å: the amount of lithium that the carbon molded article absorbs will be reduced; the strength will be weakened; and the carbon molded article will break due to the stress fatigue caused by the repeated cycles of expansion and shrinkage of the carbon particles which occur during charge and discharge, i.e., during absorption and release of lithium. Thus, an interfacial distance (d002) outside the above range is unfavorable.

To obtain the carbon powder, which is a material for the carbon molded article of the invention, commercially available fabric or particle materials of a polymer compound or a pitch are thermally decomposed by a known method to obtain carbon fibers, carbon blocks or carbon particles, which then are milled by a ball mill, vibrating ball mill or stamp mill to an average particle size of 0.05 μm to 20 μm and, optionally, classified.

The raw material of the above carbon powder may be selected from the thermal decomposition products of commercially available organic polymer compounds, condensed polycyclic hydrocarbon compounds or polycyclic heterocyclic compounds, and the thermal decomposition products of petroleum pitch, asphalt pitch, coal tar pitch or crude oil cracked pitch, and products, i.e. carbon powder, obtained by milling the pyrolyzed carbonaceous products obtained by thermal decomposition of polymer compounds. These raw materials can be used either alone or in combination.

The carbonaceous binder added to the carbon powder facilitates molding the carbon powder, bridges between particles of the carbon powder to achieve firm binding and fills gaps between particles of the carbon powder with carbon. The carbonaceous binder can be any material as long as the material becomes carbonized by heating and pyrolyzing so as to integrate with the carbon powder. Such a material suitable as a carbonaceous binder may be: a polymer compound, petroleum pitch, asphalt pitch, coal tar pitch, crude oil cracked pitch or pitch obtained by thermally decomposing organic polymer compounds such as condensed polycyclic hydrocarbon compounds and polycyclic heterocyclic compounds.

To embody the present invention, the average particle size of the carbon powder should preferably be within a range from 0.05 μm to 20 μm, more preferably within a range from 0.5 μm to 10 μm. Carbon powder having an average particle size greater than 20 μm is unfavorable because the bulk density and mechanical strength of the carbon molded article produced therefrom become too low. Carbon powder having an average particle size less than 0.05 μm is impractical because the gaps between carbon particles in the carbon molded article produced become too small so that the carbon molded article is likely to break due to the repeated cycles of expansion and shrinkage of the carbon particles which occur during absorption and release of lithium.

In the present invention, the carbon powder and the carbonaceous binder are homogeneously mixed by a known mixer means such as a V type mixer. The carbonaceous binder to be mixed should preferably have an average particles size of 20 μm or less, more preferably 10 μm or less, as in the carbon powder, in order to fully utilize the effect of the binder, i.e., a cement, and increase the efficiency of packing the gaps between the carbon powder particles. Considering workability and efficiency for molding of the mixture and dimensional stability of the molding during pyrolyzing, the carbonaceous binder should preferably be a pitch having a softening point (a floating point, KOKASHIKI flow-tester method) within a range from 100° to 500° C., more preferably within a range from 180° to 300° C.

The homogenized mixture of the carbon powder and the carbonaceous binder is pressure-molded into a predetermined shape by a normal method. Alternatively it is processed into a sheet having a thickness of 0.05 to 50 mm, and the sheet is punched so as to obtain a carbon article of a predetermined shape. Then, the carbon article is pyrolyzed at a temperature of 800° to 1500° C. in an inert gas, e.g., argon gas or nitrogen gas, or in a vacuum to become a carbon molded article for a negative electrode.

The thus obtained carbon molded article for a negative electrode is incorporated into a secondary battery. Industrial production of carbon molded articles requires consideration not only of electrochemical properties of the carbon molded article as an electrode but also of easy handling of the carbon molded articles during assembly, i.e., appropriate mechanical strength thereof.

In industrial production thereof, the mechanical strength of the carbon molded articles is a dominant factor to determine operational efficiency of assembly of the battery, i.e., the production profitability. Therefore, to facilitate handling of the carbon molded articles during the assembly, the three-point bending strength (at room temperature) thereof should preferably be at least 100 kgf/cm$^2$, more preferably 200 kgf/cm$^2$ or greater. Therefore, it is necessary that raw materials be selected and compounding be optimized by performing pilot experiments so as to provide a three-point bending strength of 100 kgf/cm$^2$ or greater. A carbon molded article for a negative electrode having a three-point bending strength less than 100 kgf/cm$^2$ is unfavorable because such a carbon molded article is likely to break due to the pressure inside the battery or a volume change of the carbon molded article caused by repeated cycles of charge and discharge.

Instead of the interfacial distance (d002) measured by X-ray diffraction, crystal size (Lc002) may be used as an effective standard to evaluate the quality of the carbon molded articles. A carbon molded article having a crystal size (Lc002) less than 8 Å will have an excessively increased amorphous portion and will sometimes experience an undesired phenomenon such as self-discharge or reduction of charge-discharge efficiency. If the crystal size is greater than 120 Å, the lithium absorbing capacity will be reduced, and the carbon skeleton structure, i.e., the crystal lattice, will likely break resulting in a negative electrode of poor reversibility. Thus, the crystal size (Lc002) should preferably be within a range from 8 Å to 120 Å, more preferably from 10 Å to 50 Å.

Further, bulk density can be used as an effective standard to evaluate the quality of the carbon molded articles for negative electrodes. If a carbon molded article having a bulk density less than 0.7 g/cm$^3$ is used as the negative electrode of a battery, the energy density per unit volume of the battery will become too small, resulting in an impractical secondary battery. Therefore, it is preferable to use carbon molded articles having bulk densities within a range from 0.7 g/cm$^3$ to 1.6 g/cm$^3$ in the industrial production.

If the carbon molded articles to be used as positive electrodes contain a lithium compound as the positive electrode active substance, such as $LiCoO_2$, $LiNiCoO_2$, $LiMnO_2$ or $LiMn_2O_4$, the same kind of carbon molded articles can also be used as negative electrodes. On the other hand, if the positive electrode active substance is selected from, instead of a lithium compound, oxides such as $TiO_2$, $Cr_3O_5$, $V_2O_5$, $V_3O_6$, $MnO_2$ and $MnO_3$, sulfides such as $TiS_2$, $VS_2$, FeS and $MoS_3$, a selenium compound such as $NbSe_3$, conjugated polymer compounds such as polyacetylene, polyparaphenylene, polypyrole, polythiophene and polyaniline, and activated carbon, lithium of a predetermined amount is absorbed into or press-fixed to carbon molded articles in order to obtain the carbon molded articles for negative electrodes. The method for lithium absorption into carbon molded article for negative electrodes is not restricted, and any suitable method may be employed. One of the generally employed methods is an electrochemical method in which a current is passed between the positive electrode of a carbon molded article and the negative electrode of a lithium metal in an organic electrolyte solution or between such electrodes connected by a conductor.

According to the present invention, there is no restriction for the positive electrode as long as it has required properties for a positive electrode of a secondary battery. In general, positive electrodes are produced by a method in which a positive electrode material in the form of powder, i.e. a positive electrode active substance, mixed with, if necessary, polyethylene powder or polytetrafluoroethylene powder or an electrically conductive material, e.g., graphite and carbon black, is formed into films or plates. The thus produced positive electrodes are suitable to be used as the negative electrodes of secondary batteries of the present invention.

A lithium secondary battery according to the present invention requires synthetic resin fiber, glass fiber, woven or nonwoven fabric of natural fiber as separators. The synthetic resin fiber may be polyethylene, polypropylene or polytetrafluoroethylene. The thickness of a separator is determined by considerations of the quantity of the organic electrolyte solution the separator retains and preventing a short from occurring between the electrodes. In general, the thicknesses of separators are within a range of from 0.01 mm to 10 mm, preferably from 0.03 mm to 5 mm.

A lithium battery according to the present invention may employ current collectors made of materials which are electrochemically inert with respect to the positive and negative electrodes and the organic electrolyte solution. It is preferable to use suitable current collectors in order to obtain upgraded and constant performance of the secondary battery. The current collectors of the secondary batteries of the present invention may be the same type of current collectors as used in conventional batteries, such as plates, foils or meshes of nickel, titanium or stainless steel. The materials of the current collectors for the positive and negative electrodes may be different from each other. The thicknesses of the current collectors are determined within a range from 0.001 mm to 5 mm.

A lithium secondary battery according to the present invention employs an organic electrolyte solution obtained by dissolving a lithium salt in a high-dielectric organic solvent. There is no restriction on the kinds of lithium salt that may be used. For example, $LiClO_4$, $LiBF_4$, $LiPF_6$, $LiAsF_6$ and $LiSbF_6$ may be used, and $LiClO_4$, $LiPF_6$, and $LiSbF_6$ are advantageous. Further, though a single kind of lithium salt is usually used, a combination of two or more kinds is also possible. The concentration of lithium salt is within a range of from 0.1 mol/l to 5.0 mol/l, preferably 0.5 mol/l to 1.5 mol/l.

The organic solvent used in the lithium secondary battery of the invention may be of any type as long as it dissolves lithium salt and is non-protonic and has a high dielectric constant. Such organic solvents are nitriles, carbonates, ethers, nitro compounds, amides, sulfur-containing compounds, chlorinated hydrocarbons, ketones and esters. More specifically, acetonitrile, propionitrile, propylene carbonate, ethylene carbonate, tetrahydrofuran, dioxane, 1,2-dimethoxyethane, nitromethane, N,N-dimethylformamide, dimethylsulfoxide, sulfolane and γ-butyrolactone are preferable. A single one or a combination of two or more of the above organic solvents may be used.

The secondary battery according to the present invention may be formed in any shape, e.g., in a shape of a coin, a sheet of paper, a card or a box, as long as the shape does not hinder the production of component parts of the secondary battery, assembly of the secondary battery, or injection of an electrolyte solution. The assembly of the secondary battery of the invention may be performed according to a known method.

Because a molded article for a negative electrode according to the present invention is formed of carbon atoms alone and contains no polymer compounds or solvents such as polytetrachloroethylene or polypropylene, heat generation and reduction of the battery capacity are substantially prevented.

In this invention, the room temperature at which the three-point bending strength of a carbon molded article is measured generally ranges between 5° C. and 35° C.

DESCRIPTION OF THE PREFERRED EMBODIMENTS

Embodiments of the present invention and comparative examples will be described hereinafter. However, it is to be understood that the below embodiments are only illustrative and do not limit the scope and spirit of the present invention.

Embodiment 1

Carbon powder having an average particle size of 4.3 μm was obtained by milling 100 g of polyacrylonitrile type carbon fiber (7 μm in fiber diameter, 160 μm in length) at 700 rpm for 16 hours by a ball mill crusher "trademark: pot mill type B-108" made by NIHON KAGAKU TOGYO KABUSHIKI KAISHA.

A mixture of naphthalene 1 mol, hydrogen fluoride (HF) 0.5 mol and boron trifluoride (BF:) 0.5 mol was put in an acid-proof autoclave having a capacity of 500 ml and then heated to 260° C. and maintained at the same temperature under a pressure of 25 kg/cm² so that reactions took place among the ingredients. Then, the remaining hydrogen fluoride (HF) and boron trifluoride ($BF_3$) were recovered by jetting nitrogen into the autoclave by a normal method. A pitch having a softening point of 216° C. was obtained by removing substances having lower boiling points. The pitch was milled by a ball mill until pitch powder having an average particle size of 1.2 μm was obtained.

Eighty parts by weight of carbon powder and 20 parts by weight of the pitch powder were homogeneously mixed by a mixer "trademark: KEN MIX AIKO" made by KODAIRA SEISAKU-SHO Ltd., at 200 rpm for one hour. The homogenized mixture was rolled into sheets having a thickness of 0.4 mm by a normal method. The sheets were punched so as to provide sample pieces of 10 mm wide and 30 mm long for measuring properties and sample pieces having a diameter of 15 mm for testing as the negative electrodes of secondary batteries.

These sample pieces were placed at designated positions in an electric furnace "model TSH 1060" made by SILICOUNT KONETSU KOGYO KABUSHIKI KAISHA, and pyrolyzed at 1300° C. for 2 hours in a flow of nitrogen gas so that carbon articles (test samples) were obtained.

The following properties of the carbon molded article (sample pieces) were obtained: a bulk density of 1.25 g/cm³, an interfacial distance (d002) of 3.47 Å, a crystal size along the c-axis (Lc) of 20 Å and a three-point bending strength of 520 kgf/cm².

Secondary batteries were produced by a normal method, using: the carbon molded articles for negative electrodes (sample pieces having a diameter of 15 mm and weighing 90 mg); an electrolyte solution obtained by dissolving lithium perchlorate (1.0 mol/l) in an equivalent-volume mixture of propylene carbonate and 1,2-dimethoxyethane, micro pore films having a thickness of 50 μm made of polypropylene resin as separators; and as positive electrodes, a circularly molded article (250 mg in weight, 15 mm in diameter) formed by pressure-molding a mixture of 85 parts by weight of $LiCoO_2$, 10 parts by weight of acetylene black (an electrically conductive material) and 5 parts by weight of polytetrafluoroethylene powder (a binder).

The initial open-circuit voltage of the secondary batteries was 3.20 V(volt). Further, the secondary batteries were charged at a constant current having a current density of 1.0 mA/cm² until the charging voltage reached 4.10 V. Then, discharge tests were performed at a constant current having a current density of 1.0 mA/cm². As results, an initial discharge capacity of 24.7 mAh and an efficiency of the initial discharge capacity of 90.2% were obtained.

Further, charge-discharge cycle tests at a constant current were performed at a current density of 1.0 mA/cm², a lower limit voltage of 2.00 V and an upper limit voltage of 4.10 V. The observed discharge capacities were: 24.0 mAh at the 40th cycle, 28.8 mAh at the 220th cycle, and 23.0 mAh at the 520th cycle.

After 520 cycles of the charge-discharge cycle tests at a constant current, the batteries used in the tests were disassembled to examine the sample pieces for the negative electrodes, and no abnormalities were found.

Embodiment 2

Instead of a mixture of 80 parts by weight of carbon powder and 20 parts by weight of pitch powder as used in Embodiment 1, a mixture of 85 parts by weight of the carbon powder and 15 parts by weight of the pitch powder was used to form carbon molded articles. The rest of the method of producing the carbon molded articles and the method of performing the evaluation tests were the same as in Embodiment 1.

The properties of the thus obtained carbon molded articles (sample pieces for measuring the properties) were as follows: a bulk density of 1.22 g/cm$^3$, an interfacial distance (d002) of 3.46 Å, a crystal size along the c-axis (Lc) of 21 Å and a three-point bending strength of 440 kgf/cm$^2$.

Secondary batteries were produced and the charge-discharge cycle tests at a constant current were performed in the same way as in Embodiment 1. The results were substantially the same as in Embodiment 1.

Embodiment 3

Instead of a mixture of 80 parts by weight of carbon powder and 20 parts by weight of pitch powder as used in Embodiment 1, a mixture of 90 parts by weight of the carbon powder and 10 parts by weight of the pitch powder was used to form carbon molded articles. The rest of the method of producing the carbon molded articles and the method of performing the evaluation tests were the same as in Embodiment 1.

The properties of the thus obtained carbon molded articles (sample pieces for measuring the properties) were as follows: a bulk density of 1.20 g/cm$^3$, an interfacial distance (d002) of 3.46 Å, a crystal size along the c-axis (Lc) of 21 Å and a three-point bending strength of 180 kgf/cm$^2$.

Secondary batteries were produced and the charge-discharge cycle tests at a constant current were performed in the same way as in Embodiment 1. The results were substantially the same as in Embodiment 1.

Embodiment 4

Instead of pyrolyzing the sample pieces at a temperature of 1300° C. as in Embodiment 2, the sample pieces were heated at 1200° C. The rest of the method of producing the carbon molded articles and the method of performing the evaluation tests were the same as in Embodiment 2.

The properties of the thus obtained carbon molded articles (sample pieces for measuring the properties) were as follows: a bulk density of 1.21 g/cm$^3$, an interfacial distance (d002) of 3.47 Å, a crystal size along the c-axis (Lc) of 20 Å and a three-point bending strength of 360 kgf/cm$^2$.

Secondary batteries were produced and the charge-discharge cycle tests at a constant current were performed in the same way as in Embodiment 1. The results were substantially the same as in Embodiment 1.

Embodiment 5

Instead of pyrolyzing the sample pieces at a temperature of 1300° C. as in Embodiment 1, the sample pieces were pyrolyzed at 1400° C. The rest of the method of producing the carbon molded articles and the method of performing the evaluation tests were the same as in Embodiment 1.

The properties of the thus obtained carbon molded articles (sample pieces for measuring the properties) were as follows: a bulk density of 1.30 g/cm$^3$, an interfacial distance (d002) of 3.45 Å, a crystal size along the c-axis (Lc) of 23 Å and a three-point bending strength of 680 kgf/cm$^2$.

Secondary batteries were produced and the charge-discharge cycle tests at a constant current were performed in the same way as in Embodiment 1. The results were substantially the same as in Embodiment 1.

Embodiment 6

Instead of pyrolyzing the sample pieces at a temperature of 1300° C. as in Embodiment 2, the sample pieces were pyrolyzed at 1000° C. The rest of the method of producing the carbon molded articles and the method of performing the evaluation tests were the same as in Embodiment 2.

The properties of the thus obtained carbon molded articles (sample pieces for measuring the properties) were as follows: a bulk density of 1.18 g/cm$^3$, an interfacial distance (d002) of 3.48 Å, a crystal size along the c-axis (Lc) of 19 Å and a three-point bending strength of 240 kgf/cm$^2$.

Embodiment 7

Instead of using carbon powder (4.3 μm in average particle size) obtained by milling polyacrylonitrile type carbon fiber (7 μm in fiber diameter, 160 μm in length) as in Embodiment 1, carbon powder (4.8 μm in average particle size) obtained by milling carbon pitch type carbon fiber (12 μm in fiber diameter, 5 mm in length) was used. The rest of the method of producing carbon molded articles was the same as in Embodiment 1.

The properties of the thus obtained carbon molded articles (sample pieces for measuring the properties) were as follows: a bulk density of 1.25 g/cm$^3$, an interfacial distance (d002) of 3.43 Å, a crystal size along the c-axis (Lc) of 56 Å and a three-point bending strength of 200 kgf/cm$^2$.

In accordance with a normal method of producing a carbon article for a negative electrode, a separator formed of a micro-pore film made of polypropylene resin having a thickness of 50 μm was interposed between a carbon molded article (a sample piece for a negative electrode, 15 mm in diameter and 85 mg in weight) and a lithium metal disc (18 mm in diameter, 1.5 mm in thickness). Then, this layered composite was inserted between two stainless steel plates (the positive and negative electrode plates) and press-fixed. Then, the thus obtained layered composite was dipped in a solution obtained by dissolving lithium fluorophosphide (1.0 mol/l) in an equivalent-volume mixture of propylene carbonate and 1,2-dimethoxyethane so that the separator absorbed the solution. Then, the electrode plates (the stainless steel plates) were short-circuited for 48 hours so that a carbon molded article (a composite) for a negative electrode containing lithium was obtained.

In accordance with a normal method, secondary batteries were produced using: the carbon molded articles (composites) for the negative electrodes obtained as described above; separators formed of non-woven fabric of polypropylene having absorbed a solution obtained by dissolving lithium fluorophosphide (1.0 mol/l) in an equivalent-volume mixture of propylene carbonate and 1,2-dimethoxyethane; and as positive electrodes, circularly molded articles (each 200 mg in weight, 15 mm in diameter) formed by pressure-molding a mixture of 80 parts by weight of vanadium pentoxide, 10 parts by weight of acetylene black (an electrically conductive material) and 10 parts by weight of polytetrafluoroethylene powder (a binder).

The initial open-circuit voltage of the secondary batteries was 3.45 V(volt). Then, the secondary batteries were tested on the discharge at a constant current having a current density of 1.0 mA/cm$^2$ until the discharging voltage reached 2.00 V. As a result, a discharge capacity of 28.0 mAh was obtained.

Further, charge-discharge cycle tests at a constant current were performed at a current density of 1.0 mA/cm$^2$, a lower limit voltage of 2.00 V and an upper limit voltage of 3.90 V. The observed discharge capacities were: 26 0 mAh at the 80th cycle, and 25.6 mAh at the 300th cycle.

After 300 cycles of the charge-discharge cycle tests at a constant current, the batteries used in the tests were disassembled to examine the sample pieces (the carbon molded articles of the negative electrodes), and no abnormalities were found.

Embodiment 8

A pitch powder having a softening point of 216° C. and an average particle size of 1.2 μm as obtained in Embodiment 1 was pyrolyzed at 1000° C. for 2 hours under an atmosphere of nitrogen in an electric furnace and then milled by a ball mill until carbon powder having an average particle size of 4.0 μm was obtained.

Eighty-five parts by weight of the thus obtained carbon powder, 15 parts by weight of the pitch powder obtained as in Embodiment 1 and 10 parts by weight of acrylic rubber were homogeneously mixed and kneaded in the same manner as in Embodiment 1. Using this mixture, carbon molded particles (sample pieces) were obtained as in Embodiment 1.

The properties of the thus obtained carbon molded articles (sample pieces for measuring the properties) were as follows: a bulk density of 1.10 g/cm$^3$, an interfacial distance (d002) of 3.44 Å, a crystal size along the c-axis (Lc) of 40 Å and a three-point bending strength of 270 kgf/cm$^2$.

By a normal method, negative electrodes were produced by press-fixing lithium foils (7.8 mg) having a thickness of 100 μm to the sample pieces for negative electrodes.

Using the thus obtained electrodes, secondary batteries were produced in the same manner as in Embodiment 7. After the secondary batteries were allowed to stand for 2 days, the initial open-circuit voltage of the secondary batteries measured 3.44 V(volt). Then, the secondary batteries were tested by discharge at a constant current having a current density of 1.0 mA/cm$^2$ until the discharging voltage reached 2.00 V. As a result, a discharge capacity of 27.0 mAh was observed.

Further, charge-discharge cycle tests at a constant current were performed at a current density of 1.0 mA/cm$^2$, a lower limit voltage of 2.00 V and an upper limit voltage of 3.90 V. The observed discharge capacities were: 25.4 mAh at the 80th cycle, and 23.6 mAh at the 250th cycle.

After 250 cycles of the charge-discharge cycle tests at a constant current, the batteries used in the tests were disassembled to examine the sample pieces (the carbon molded articles of the negative electrodes), and no abnormalities were found.

Comparative Example 1

Instead of a mixture of 80 parts by weight of carbon powder and 20 parts by weight of pitch powder as used in Embodiment 1, a mixture of 95 parts by weight of the carbon powder and 5 parts by weight of pitch powder was used to form carbon molded articles (samples). The rest of the method of producing the carbon molded articles was the same as in Embodiment 1.

The properties of the thus obtained carbon molded articles (sample pieces for measuring the properties) were as follows: a bulk density of 1.18 g/cm$^3$, an interfacial distance (d002) of 3.46 Å, a crystal size along the c-axis (Lc) of 19 Å and a three-point bending strength of 45 kgf/cm$^2$.

An attempt to produce secondary batteries in the same way as in Embodiment 1 failed because the carbon molded article was too easily broken.

Comparative Example 2

Instead of a mixture of 80 parts by weight of carbon powder and 20 parts by weight of pitch powder as used in Embodiment 1, a mixture of 93 parts by weight of the carbon powder and 7 parts by weight of the pitch powder was used to form carbon molded articles (samples). The rest of the method of producing the carbon molded articles was the same as in Embodiment 1.

The properties of the thus obtained carbon molded articles (sample pieces for measuring the properties) were as follows: a bulk density of 1.28 g/cm$^3$, an interfacial distance (d002) of 3.64 Å, a crystal size along the c-axis (Lc) of 19 Å and a three-point bending strength of 83 kgf/cm$^2$.

Secondary batteries were produced in the same manner as in Embodiment 1. In charge-discharge cycle tests at a constant current, the discharge capacity started to decrease at the 21st cycle and nearly reached zero at the 50th cycle.

After the charge-discharge cycle tests at a constant current, the secondary batteries used in the tests were disassembled to examine the sample pieces (the carbon molded articles of the negative electrodes). The sample pieces had been broken into small pieces.

Comparative Example 3

Instead of a mixture of 80 parts by weight of carbon powder and 20 parts by weight of pitch powder as used in Embodiment 1, a mixture of 90 parts by weight of the carbon powder and 10 parts by weight of polytetrafluoroethylene was used to form carbon molded articles (samples). The rest of the method of producing the carbon molded articles were the same as in Embodiment 1.

Secondary batteries were produced in the same manner as in Embodiment 1. The initial open-circuit voltage of the secondary batteries was 3.28 V(volt). Further, the secondary batteries were charged at a constant current having a current density of 1.0 mA/cm$^2$ until the charging voltage reached 4.10 V. Then, discharge tests were performed at a constant current having a current density of 1.0 mA/cm$^2$. As a result, an initial discharge capacity of 22.0 mAh and an efficiency of the initial discharge capacity of 78.2% were obtained.

Further, charge-discharge cycle tests at a constant current were performed at a current density of 1.0 mA/cm$^2$, a lower limit voltage of 2.00 V and an upper limit voltage of 4.10 V. The observed discharge capacities were: 18.0 mAh at the 40th cycle, 13.4 mAh at the 80th cycle, and 10.1 mAh at the 100th cycle.

After the charge-discharge cycle tests at a constant current, the secondary batteries used in the tests were disassembled to examine the sample pieces (the carbon molded articles of the negative electrodes). A small amount of the carbon powder had broken free from the carbon molded article of the negative electrode and contaminated the electrolyte.

Comparative Example 4

Instead of polyacrylonitrile type carbon fiber having an average particle size of 4.3 μm as used in Embodiment 1, activated carbon powder having an average particle size of 5.2 μm was used to form carbon molded articles (samples). The pyrolyzing of the sample pieces was performed at 1000° C., instead of 1300° C. as in Embodiment 1. The rest of the method of producing the carbon molded articles was the same as in Embodiment 1.

The properties of the thus obtained carbon molded articles (sample pieces for measuring the properties) were as follows: a bulk density of 0 93 g/cm$^3$, an interfacial distance (d002) of 3.65 Å, a crystal size along the c-axis (Lc) of 10 Å and a three-point bending strength of 150 kgf/cm$^2$.

Secondary batteries were produced in the same manner as in Embodiment 1. During an attempt to charge the secondary batteries at a constant current, a gas was generated. In following charge-discharge cycle tests at a constant current, the secondary batteries discharged only a little and a substantial discharge capacity was not obtained. The produced batteries did not function as workable batteries.

Comparative Example 5

Instead of polyacrylonitrile type carbon fiber having an average particle size of 4 3 μm as used in Embodiment 1, artificial graphite having an average particle size of 10 μm was used to form carbon molded articles (samples). The rest of the method of producing the carbon molded articles was the same as in Embodiment 1.

The properties of the thus obtained carbon molded articles (sample pieces for measuring the properties) were as follows: a bulk density of 1.39 g/cm$^3$, an interfacial distance (d002) of 3.36 Å, a crystal size along the c-axis (Lc) of 250 Å and a three-point bending strength of 180 kgf/cm$^2$.

Secondary batteries were produced in the same manner as in Embodiment 1. In charge-discharge cycle tests at a constant current, the secondary batteries discharged only a little and a substantial discharge capacity was not obtained. The produced batteries did not function as workable batteries.

After the charge-discharge cycle tests at a constant current, the secondary batteries used in the tests were disassembled to examine the sample pieces for the negative electrodes. There was some evidence of swelling and cracks in the carbon molded articles of the negative batteries.

As described above, the present invention provides a carbon molded article for a negative electrode which has an interfacial distance and a mechanical strength within specific ranges, a high energy density per unit volume and advantageous charge-discharge characteristics for higher loads. According to the present invention, such carbon molded articles for negative electrodes and, particularly, the negative electrodes for lithium secondary batteries and lithium secondary batteries can be produced on an industrial scale at low production costs.

What is claimed is:

1. A molded article for a negative electrode, comprising:
    a carbon molded article formed by molding a mixture including carbon powder and a carbonaceous binder and pyrolyzing the molded product, wherein the interfacial distance (d002) of said carbon molded article measured by X-ray diffraction is within a range from 3.38 Å to 3.56 Å and said carbon molded article has a three-point bending strength at room temperature of at least 100 kgf/cm$^2$.

2. A molded article for a negative electrode according to claim 1, wherein the crystal size (Lc002) of said carbon molded article is within a range from 8 Å to 120 Å.

3. A molded article for a negative electrode according to claim 1, wherein the bulk density of said carbon molded article is within a range from 0.7 g/cm$^3$ to 1.6 g/cm$^3$.

4. A molded article for a negative electrode according to claim 1, wherein said molded product is pyrolyzed at a temperature within a range from 800° to 1500° C. in an inert gas or a vacuum.

5. A molded article for a negative electrode according to claim 1, wherein said carbon powder consists essentially of a product obtained by milling at least one of the following: carbon fabric, a carbon block or a powder-and-granular carbon material, until the average particle size is reduced to a range from 0.05 μm to 20.0 μm.

6. A molded article for a negative electrode according to claim 1, wherein said carbon powder consists essentially of a product obtained by milling the thermal decomposition products of at least one material selected from the group consisting of: organic polymer compounds, polymer compounds, condensed polycyclic hydrocarbon compounds, polycyclic heterocyclic compounds, petroleum pitch, asphalt pitch, coal tar pitch and crude oil cracked pitch, until the average particle size is reduced to a range from 0.05 μm to 20.0 μm.

7. A molded article for a negative electrode according to claim 1, wherein said carbonaceous binder consists essentially of a product obtained by milling at least one of the pitches obtained by thermally decomposing the following: polymer compound pitch, petroleum pitch, asphalt pitch, coal tar pitch, crude oil cracked pitch or organic polymer compounds, until the average particle size is reduced to 20.0 μm or less.

8. A molded article for a negative electrode according to claim 7, wherein the softening point of said carbonaceous binder is within a range from 100° to 500° C.

9. A molded article for a negative electrode according to claim 1, wherein said mixture is obtained by mixing 100 parts by weight of said carbon powder and from 8 to 25 parts by weight of said carbonaceous binder.

10. A method of producing a molded article for a negative electrode, comprising the steps of:
    mixing carbon powder and a carbonaceous binder;
    molding the mixture; and
    pyrolyzing the molded product so that the interfacial distance (d002) of the pyrolyzed molded article measured by X-ray diffraction is within a range from 3.38 Å to 3.56 Å and the three-point bending strength of said carbon molded article at room temperature is at least 100 kgf/cm$^2$.

11. A method of producing a molded article for a negative electrode according to claim 10, wherein said molded product is pyrolyzed at a temperature within a range from 800° to 1500° C.

12. A method of producing a molded article for a negative electrode according to claim 10, wherein 100 parts by weight of said carbon powder and from 8 to 25 parts by weight of said carbonaceous binder are mixed.

13. A method of producing a molded article for a negative electrode according to claim 10, wherein the average particle size of said carbon powder is within a range from 0.05 μm to 20.0 μm.

14. A method of producing a molded article for a negative electrode according to claim 10, wherein the average particle size of said carbonaceous binder is 20.0 μm or less.

15. A lithium secondary battery comprising:
a positive electrode containing a positive electrode active substance;
a negative electrode comprising a carbon molded article formed by molding a mixture including carbon powder and a carbonaceous binder and then pyrolyzing the molded product so that the interfacial distance (d0002) of said carbon molded article measured by X-ray diffraction is within a range from 3.38 Å to 3.56 Å and the three-point bending strength of said carbon molded article at room temperature is at least 100 kgf/cm$^2$;
a separator for preventing a short between said positive electrode and said negative electrode; and
an electrolyte containing lithium.

16. A lithium secondary battery according to claim 15, wherein the crystal size (Lc002) of said carbon molded article is within a range from 8 Å to 120 Å.

17. A lithium secondary battery according to claim 15, wherein the bulk density of said carbon molded article is within a range from 0.7 g/cm$^3$ to 1.6 g/cm$^3$.

18. A lithium secondary battery according to claim 15, wherein said molded product is pyrolyzed at a temperature within a range from 800° to 1500° C. in an inert gas or a vacuum.

19. A lithium secondary battery according to claim 15, wherein said carbon powder consists essentially of a product obtained by milling at least one of the following: carbon fabric, a carbon block or a powder-and-granular carbon material, until the average particle size is reduced to a range from 0.05 μm to 20.0 μm.

20. A lithium secondary battery according to claim 15, wherein said carbon powder consists essentially of a product obtained by milling the thermal decomposition products of at least one selected from the group consisting of: organic polymer compounds, polymer compounds, condensed polycyclic hydrocarbon compounds, polycyclic heterocyclic compounds, petroleum pitch, asphalt pitch, coal tar pitch and crude oil cracked pitch, until the average particle size is reduced to a range from 0.05 μm to 20.0 μm.

21. A lithium secondary battery according to claim 15, wherein said carbonaceous binder Consists essentially of a product obtained by milling at least one of the pitches obtained by thermally decomposing the following: polymer compound pitch, petroleum pitch, asphalt pitch, coal tar pitch, crude oil cracked pitch or organic polymer compounds, until the average particle size is reduced to 20.0 μm or less.

22. A lithium secondary battery according to claim 21, wherein the softening point of said carbonaceous binder is within a range from 100° to 500° C.

23. A lithium secondary battery according to claim 15, wherein said mixture is obtained by mixing 100 parts by weight of said carbon powder and from 5 to 25 parts by weight of said carbonaceous binder.

24. A lithium secondary battery according to claim 15, wherein said carbon molded article has absorbed lithium.

25. A lithium secondary battery according to claim 15, wherein both said positive electrode and said negative electrode or either said positive electrode or said negative electrode comprises a current collector.

* * * * *

UNITED STATES PATENT AND TRADEMARK OFFICE
CERTIFICATE OF CORRECTION

PATENT NO. : 5,238,760
DATED : August 24, 1993
INVENTOR(S) : Takahashi et al.

It is certified that error appears in the above-indentified patent and that said Letters Patent is hereby corrected as shown below:

Claim 15, column 15, line 18, change "(d0002)" to --(d002)--.

Claim 19, column 16, line 2, change ";" to --:--.

Claim 21, column 16, line 16, change "Consists" to --consists--.

Signed and Sealed this

Fifth Day of April, 1994

Attest:

BRUCE LEHMAN

*Attesting Officer*  *Commissioner of Patents and Trademarks*